(12) United States Patent
Calcote

(10) Patent No.: US 8,161,814 B2
(45) Date of Patent: Apr. 24, 2012

(54) SELF-CALIBRATING CAPACITIVE TRANSDUCER FOR DETERMINING LEVEL OF FLUENT MATERIALS

(75) Inventor: Clyde Calcote, Richardson, TX (US)

(73) Assignee: Luna Labs, Inc., Richardson, TX (US)

( * ) Notice: Subject to any disclaimer, the term of this patent is extended or adjusted under 35 U.S.C. 154(b) by 883 days.

(21) Appl. No.: 12/135,359

(22) Filed: Jun. 9, 2008

(65) Prior Publication Data

US 2009/0301188 A1    Dec. 10, 2009

(51) Int. Cl.
*G01F 23/24* (2006.01)
(52) U.S. Cl. ...... 73/304 C; 73/1.02; 73/304 R; 73/290 R
(58) Field of Classification Search ............ 73/1.02, 73/1.73, 290 B, 290 R, 290 V, 304 C, 304 R
See application file for complete search history.

(56) References Cited

U.S. PATENT DOCUMENTS

| | | | | |
|---|---|---|---|---|
| 2,511,649 A | * | 6/1950 | Reiter | 73/297 |
| 2,955,466 A | | 10/1960 | Coles | |
| 3,184,970 A | * | 5/1965 | McNelly | 73/304 R |
| 3,277,711 A | | 10/1966 | Roberge | |
| 3,343,415 A | * | 9/1967 | Johnston | 73/304 C |
| 3,474,902 A | * | 10/1969 | Putman | 209/1 |
| 3,665,209 A | * | 5/1972 | Webb et al. | 307/118 |
| 3,862,571 A | * | 1/1975 | Vogel | 73/304 C |
| 3,864,974 A | | 2/1975 | Rauchwerger | |
| 3,901,079 A | * | 8/1975 | Vogel | 73/304 C |
| 3,935,970 A | | 2/1976 | Spaw | |
| 4,122,718 A | | 10/1978 | Gustafson | |
| 4,142,415 A | * | 3/1979 | Jung et al. | 73/304 C |
| 4,184,369 A | * | 1/1980 | Jung et al. | 73/304 C |
| 4,201,085 A | | 5/1980 | Larson | |
| 4,226,118 A | | 10/1980 | Aldrich | |
| 4,382,382 A | * | 5/1983 | Wang | 73/304 R |
| 4,383,443 A | * | 5/1983 | Langdon | 73/290 V |
| 4,589,281 A | | 5/1986 | Aldrich | |
| 4,757,252 A | * | 7/1988 | Maltby et al. | 324/687 |
| 4,879,902 A | * | 11/1989 | Loniello | 73/304 R |
| 4,890,490 A | * | 1/1990 | Telford | 73/290 V |
| 5,400,651 A | | 3/1995 | Welch | |
| 5,406,843 A | * | 4/1995 | Hannan et al. | 73/304 C |
| 5,424,649 A | | 6/1995 | Gluck et al. | |
| 5,481,197 A | * | 1/1996 | Sanders et al. | 324/690 |
| 5,533,392 A | * | 7/1996 | Kira | 73/290 B |
| 6,095,178 A | * | 8/2000 | Gilbert et al. | 137/199 |

(Continued)

FOREIGN PATENT DOCUMENTS

DE    3137153 A1 *  4/1983

(Continued)

*Primary Examiner* — David Rogers
(74) *Attorney, Agent, or Firm* — Alvin R. Wirthlin

(57) ABSTRACT

A capacitive transducer for detecting the level of liquids and other materials has one or more antenna probes connected to an integrated chip normally associated with touch-screen displays. Each antenna probe operates independently and senses the level condition of wet or dry flowable materials such as water, oil, fuel, grain, and so on. The antenna probes may be formed as insulated conductive wires or conductive traces between layers of a stiff or flexible substrate, such as a PCB, with the substrate material serving as the insulating layers. Each antenna probe has a different length representing different depths of the material being measured to provide dynamic calibration of the level condition independent of the material type and ambient conditions.

6 Claims, 7 Drawing Sheets

U.S. PATENT DOCUMENTS

| | | | |
|---|---|---|---|
| 6,101,873 A * | 8/2000 | Kawakatsu et al. | 73/304 C |
| 6,269,694 B2 * | 8/2001 | Morimoto | 73/305 |
| 6,334,360 B1 * | 1/2002 | Chen | 73/304 R |
| 6,539,797 B2 * | 4/2003 | Livingston et al. | 73/304 C |
| 6,677,891 B2 | 1/2004 | Fehrenbach et al. | |
| 6,761,067 B1 * | 7/2004 | Capano | 73/304 C |
| 6,842,018 B2 | 1/2005 | McIntosh | |
| 6,857,313 B2 | 2/2005 | Williamson | |
| 6,904,789 B2 | 6/2005 | Campbell et al. | |
| 6,938,479 B2 | 9/2005 | Carpenter et al. | |
| 7,062,965 B2 * | 6/2006 | Immel | 73/295 |
| 7,114,391 B2 | 10/2006 | Sasaki et al. | |
| 7,121,140 B2 * | 10/2006 | Lo | 73/305 |
| 7,161,361 B2 * | 1/2007 | Qu et al. | 324/690 |
| 7,307,485 B1 | 12/2007 | Snyder et al. | |
| 7,359,804 B2 * | 4/2008 | Williams et al. | 702/28 |
| 2001/0000851 A1 * | 5/2001 | Morimoto | 73/304 C |
| 2002/0194910 A1 * | 12/2002 | Schelhas et al. | 73/290 R |
| 2003/0233875 A1 * | 12/2003 | Stehman et al. | 73/304 C |
| 2005/0039528 A1 * | 2/2005 | Wernet et al. | 73/304 C |
| 2005/0076711 A1 * | 4/2005 | Urquidi | 73/304 C |
| 2006/0021432 A1 * | 2/2006 | Salzmann et al. | 73/304 R |
| 2006/0277992 A1 * | 12/2006 | Calabrese | 73/304 R |
| 2007/0079653 A1 * | 4/2007 | Zuleta et al. | 73/304 R |
| 2007/0169549 A1 * | 7/2007 | Kwun et al. | 73/290 V |
| 2007/0204690 A1 * | 9/2007 | Salzmann et al. | 73/304 R |
| 2007/0295056 A1 * | 12/2007 | Calabrese | 73/1.73 |
| 2008/0053202 A1 * | 3/2008 | Rohklin et al. | 73/61.41 |
| 2008/0066544 A1 * | 3/2008 | Tung et al. | 73/304 C |
| 2008/0184775 A1 * | 8/2008 | Yamagishi et al. | 73/25.05 |
| 2009/0165552 A1 * | 7/2009 | Sieh et al. | 73/304 C |

FOREIGN PATENT DOCUMENTS

DE 4025184 A1 * 2/1992

* cited by examiner

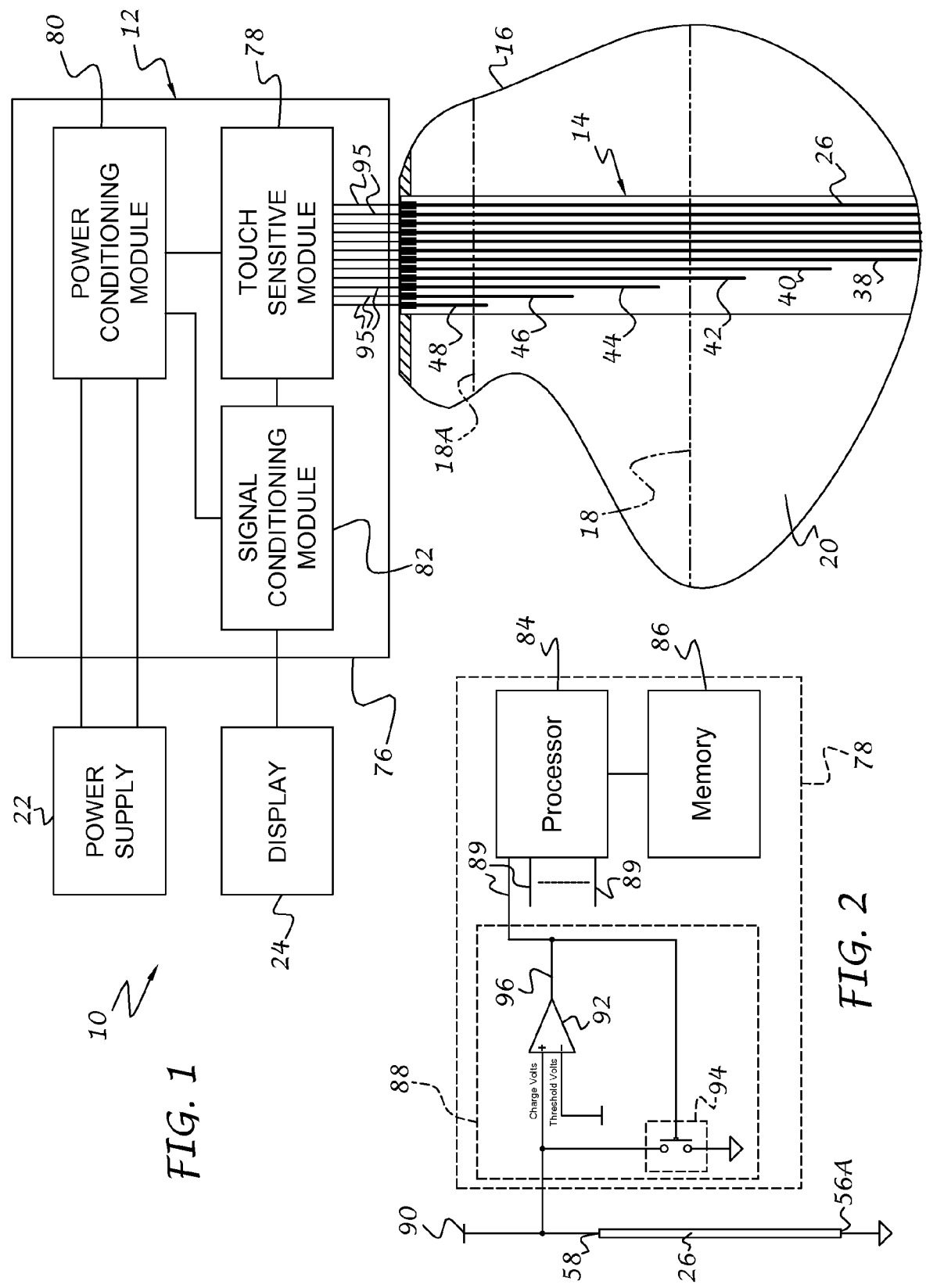

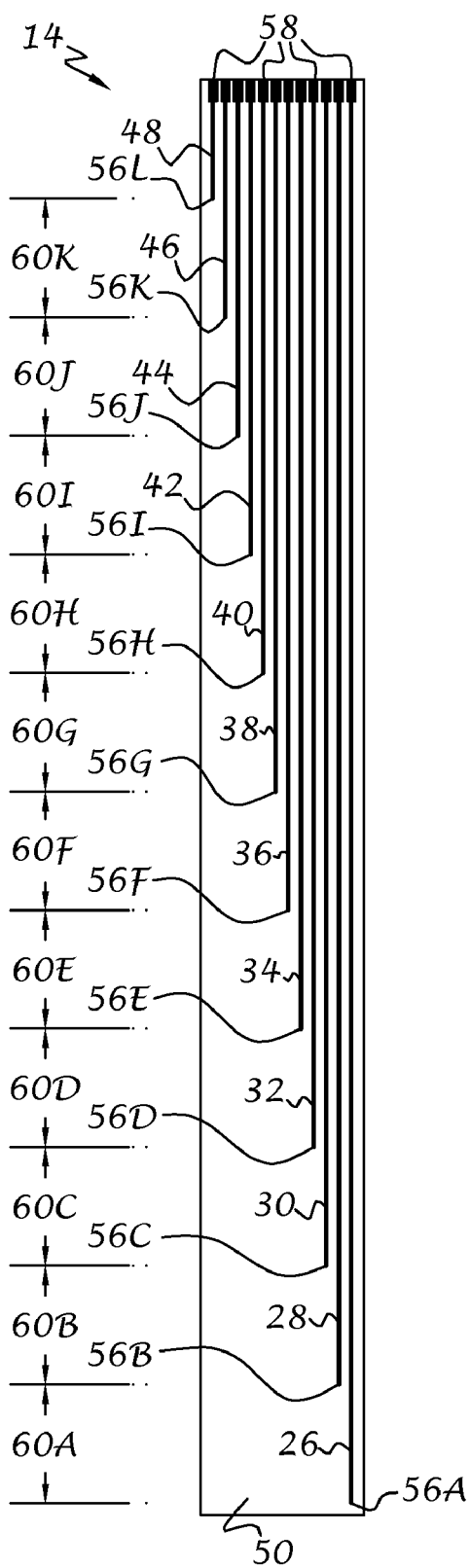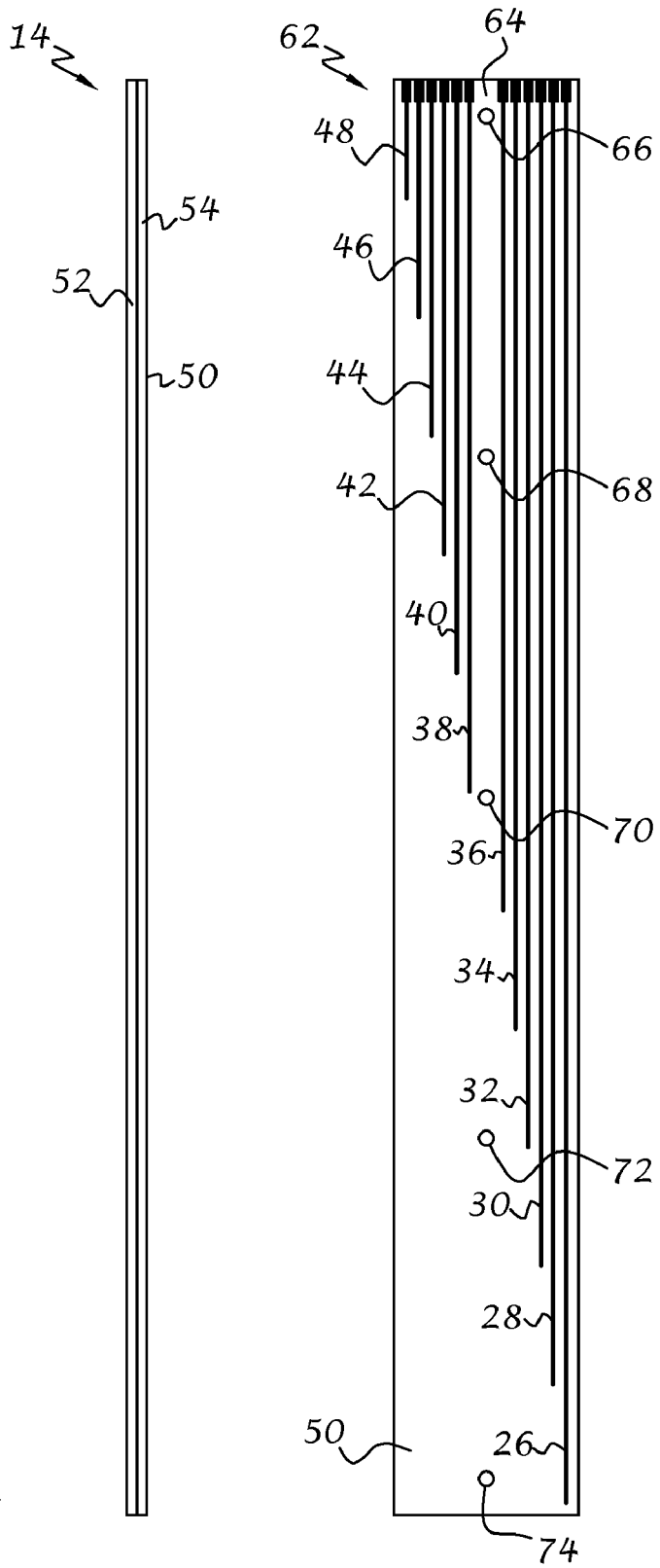
FIG. 3  FIG. 4  FIG. 5

SELF-CALIBRATING CAPACITIVE TRANSDUCER FOR DETERMINING LEVEL OF FLUENT MATERIALS

CROSS REFERENCE TO RELATED APPLICATIONS

This application is related to U.S. application Ser. No. 12/135,392 and U.S. Application Ser. No. 12/135,421 filed on even date herewith, the disclosures of which are hereby incorporated by reference.

BACKGROUND OF THE INVENTION

This invention relates to capacitive transducers, and more particularly to variable capacitance transducers for determining the level of fluent materials within a container.

Transducers for determining liquid level are often used in vehicles, industrial equipment and other systems and components. Such transducers typically operate by detecting a change in an electrical property of the transducer which varies in accordance with the liquid level.

By way of example, prior art liquid level sensors, such as fuel sensors for motor vehicles, usually include a float that rides on an upper surface of the fuel in a fuel tank. The float is typically connected to one end of a pivot arm while the other end of the pivot arm typically includes a wiper mechanism that brushes against a resistor strip when the arm is rotated due to a change in fuel level in the tank. Such sensors are prone to wear, mechanical and/or electrical breakdown or inaccurate liquid level detection. Although variable capacitance probes have been developed to overcome these drawbacks, they are cost-prohibitive in many applications and are typically limited to measure a certain type of liquid, since different liquids will have different dielectric properties.

In addition, a variable capacitance probe designed to measure fuel level normally cannot be used for measuring water level due to the different dielectric properties associated with different liquids. For example, the dielectric constant at room temperature of a vacuum is one, of air is close to one, of gasoline is about two, of industrial alcohol is anywhere from 16-31, and of water is about 80. Since capacitance is directly dependent on the dielectric constant, a transducer designed for measuring the level of one type of liquid could not be relied upon for measuring other types of liquids. However, even when the transducer is designed for measuring only one type of liquid, such as gasoline, the dielectric constant can change due to different gasoline formulations, the presence of water, alcohol, detergents, additives, as well as environmental factors such as temperature, thus leading to significant measurement inaccuracies.

In order to overcome these challenges, the prior art has suggested compensation means in the form of a reference capacitor at the bottom of the tank, which must always be immersed in the liquid being measured. The reference capacitor includes a pair of spaced plates and the liquid being measured serves as the dielectric between the plates. A dielectric constant of the liquid can then be determined and used to offset the capacitance of the liquid level sensor to compensate for dielectric variations. However, this type of solution only takes into account changes in dielectric at the bottom of the tank since it is assumed that the liquid is uniform throughout it's volume. In reality, since some liquids have a greater density than others, there may be a separation of fluids at different depths that cannot be discerned by a single reference capacitor. For example, the reference capacitor may be exposed to water or other contaminants at the bottom of a fuel tank which may lead to inaccurate dielectric compensation.

In addition, the electronics associated with capacitive measurement and compensation are relatively expensive and are thus priced out of markets where there is a long-felt need for low-cost and highly accurate liquid level transducers.

BRIEF SUMMARY OF THE INVENTION

According to one aspect of the invention, a transducer for measuring a level of fluent material in a container includes an electronics section having a touch-sensitive module with at least one port that is normally used for receiving and processing signals from a capacitive touch device; and a probe section having at least one antenna probe connected to the at least one port. The antenna probe includes an elongate electrical conductor and an insulating layer covering at least a portion of the electrical conductor. A change in detected capacitance of the at least one antenna probe is reflective of a change in level of the fluent material.

According to a further aspect of the invention, a capacitive transducer for measuring a level of fluent material in a container includes a primary capacitive antenna probe with a first elongate electrical conductor having a first length for continuously measuring material level and a secondary capacitive antenna probe with a second elongate electrical conductor having a second length shorter than the first length and an end tip positioned at a discrete measurement level. The end tip represents a trip point when reached by the material at the discrete measurement level to thereby dynamically calibrate the primary antenna probe.

According to yet a further aspect of the invention, a method of determining material level comprises: 1) providing a plurality of capacitive antenna probes with end tips at discrete positions representing different predetermined material levels; 2) establishing a pre-calibrated capacitive reference value for each probe; 3) reading a new capacitive value for each probe; 4) determining the material level based on the new probe values and probe reference values; and 5) performing a dynamic calibration after each reading to automatically compensate for variations in material properties and ambient conditions.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIG. 1 is a schematic diagram illustrating a capacitive transducer in accordance with the present invention operably associated with a tank;

FIG. 2 is a schematic view of a portion of a touch sensitive module that forms part of the capacitive transducer of FIG. 1;

FIG. 3 is a front elevational view of a probe section of the capacitive transducer in accordance with one exemplary embodiment of the invention;

FIG. 4 is a side elevational view of the probe section;

FIG. 5 is a front elevational view of a probe section in accordance with a further embodiment of the invention;

Figure 6:
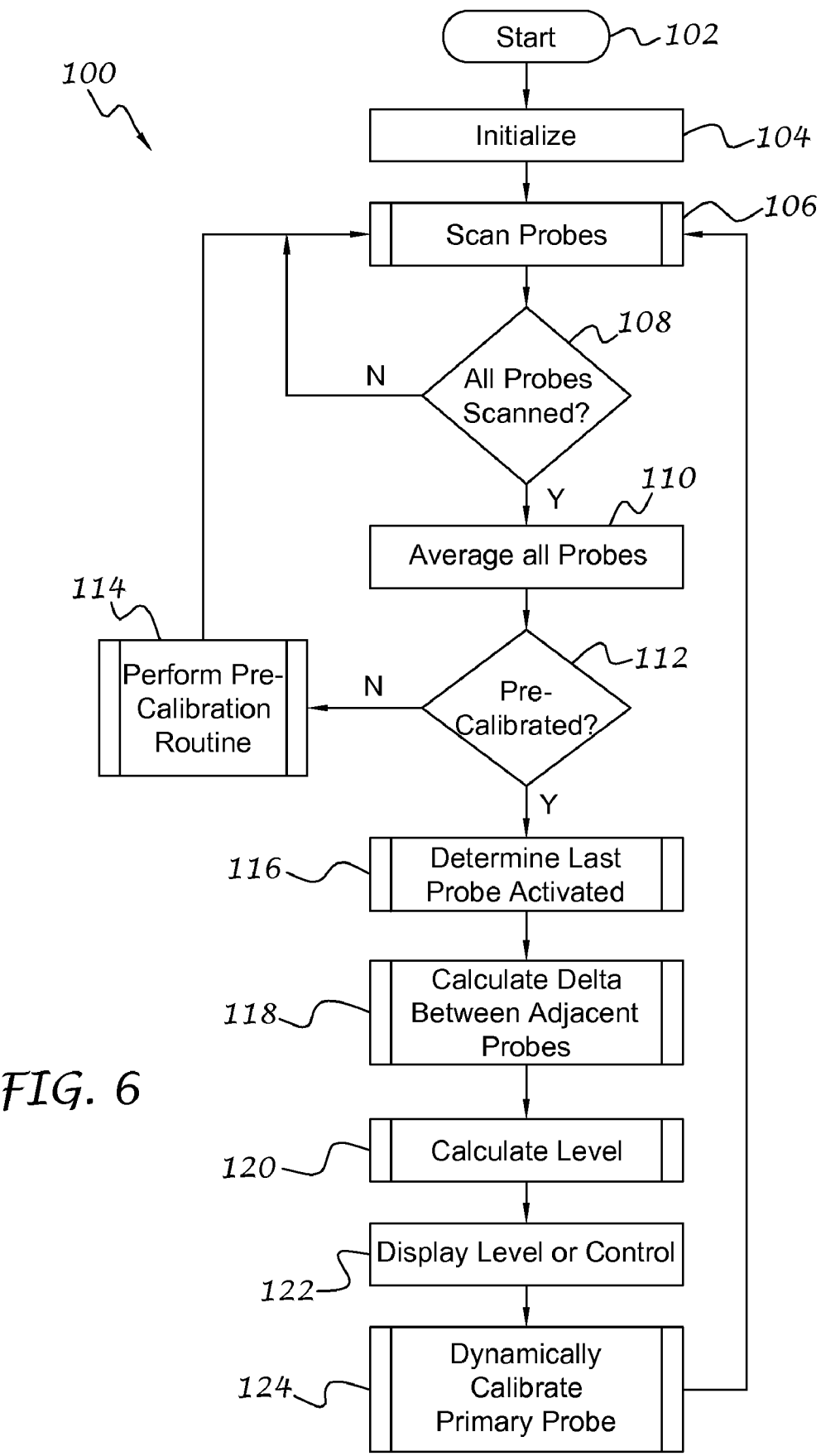
FIG. 6 is a block diagram of a method for calculating the level of a material with the capacitive transducer in accordance with the present invention.

It is noted that the drawings are intended to depict only typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Referring to the drawings, and to FIG. 1 in particular, a capacitive transducer 10 in accordance with an exemplary embodiment of the present invention is illustrated. The capacitive transducer 10 preferably includes an electronics section 12 and a probe section 14 that electrically interfaces with the electronics section. The probe section 14 is adapted for mounting inside or outside a tank 16, vessel or other container for measuring a level, as denoted by numerals 18 and 18A, of a fluent material 20 within the container. The electronics section 12 is preferably powered by an external power supply 22 and sends appropriate signals to an external display 24 or other interface, such as control circuitry (not shown) for controlling inflow and outflow of material, upon determination of material level within the container. The fluent material 20 to be measured can be in the form of liquid or granular materials. Practical applications of this invention include, but are not limited to, the measurement of water, fuel, oil, coolant, and other liquid levels in motorized vehicles and stationary equipment and systems, the measurement of granular materials within storage bins, and so on.

Referring now to FIGS. 3 and 4, the probe section 14 in accordance with an exemplary embodiment of the invention preferably includes a primary antenna probe 26 and a plurality of secondary antenna probes 28-48 formed as elongate electrically conductive electrodes or traces on an elongate electrically insulating substrate 50. The primary probe 26 is preferably constantly immersed in the material being measured while the secondary probes are used to dynamically calibrate the primary probe 26 during measurement, as will be described in greater detail below. Depending on the type of sensing application, the substrate may be a stiff or flexible printed circuit board (PCB) and the traces 26-48 may be formed between layers 52, 54 of the PCB using well-known techniques.

Each trace 26-48 has a distal tip portion 56A-56K, respectively, and a proximal connection portion 58 for electrical connection to the electronics section 12. Preferably, the traces are of diminishing length from the first trace 26 to the last trace 48 to thereby form a first space or distance 60A between the tips 56A and 56B of the traces 26 and 28; a second space 60B between the tips 56B and 56C of the traces 28 and 30; a third space 60C between the tips 56C and 56D of the traces 30 and 32; a fourth space 60D between the tips 56D and 56E of the traces 32 and 34; a fifth space 60E between the tips 56E and 56F of the traces 34 and 36; a sixth space 60F between the tips 56F and 56G of the traces 36 and 38; a seventh space 60G between the tips 56G and 56H of the traces 38 and 40; an eighth space 60H between the tips 56H and 56I of the traces 40 and 42; a ninth space 60I between the tips 56I and 56J of the traces 42 and 44; a tenth space 60J between the tips 56J and 56K of the traces 44 and 46; and an eleventh space 60K between the tips 56K and 56L of the traces 46 and 48. The spaces 60A-60K are preferably of equal dimension to facilitate level determination. However, it will be understood that the spaces may have different dimensions.

It will be further understood that the provision of twelve traces is by way of example only since more or less antenna probes may be provided. For example, when the type of flowable material to be measured is known and does not change in material properties, and when environmental factors affecting the accuracy of the measurement are known, such as temperature and humidity, it may be possible to use a single antenna probe for accurate level determination with environmental factors being resolved by the electronics section 12. In accordance with the present invention, a single antenna probe may be formed on a stiff or flexible PCB or be embodied as an insulated electrical wire that connects to the electronics section 12 or any other electrically conductive material with an insulative sheath.

When the material to be measured is unknown, or when a know material undergoes unknown or unanticipated property changes, the provision of two or more antenna probes is preferable, with accuracy of measurement increasing proportionately with the number of antenna probes provided. By way of example only, when the capacitive transducer 10 of the present invention is installed in a fuel tank of a motor vehicle, it would be very difficult to anticipate the type of fuel that would be in the tank because of variations in dielectric constant and density which are affected by temperature, humidity, pressure, fuel formulations, additives, and octane levels from different manufacturers. In addition, the operator may choose to add other substances to the fuel tank in an attempt to increase fuel economy, boost octane level, and/or reduce the presence of moisture within the tank. Similar uncertainties may also be encountered when measuring the coolant level, oil level, as well as other fluid levels of a motor vehicle, stationary equipment and other systems and components where the measurement of liquid level is desirous.

It will be understood that the present invention is not limited to the particular arrangement shown and described but includes other arrangements such as traces formed on a single layer PCB or multiple traces formed on different layers of a multi-layer PCB to increase the trace density and reduce the probe section footprint. In accordance with a further embodiment of the invention, the probe section 14 may be constructed of one or more solid or stranded conductive wires surrounded by one or more insulating layers. Where a plurality of antenna probes are used, the antenna probes may be embodied as an electrical cable having a plurality of electrically isolated conductive wires.

Referring to FIG. 5, a probe section 62 in accordance with a further embodiment of the invention is illustrated. The probe section 62 is similar in construction to the probe section 14 previously described, with the exception that a gap 64 is located between the antenna probes 36 and 38. A series of holes 66-74 are formed in the substrate 50 for receiving fasteners (not shown) such as rivets, screws, bolts or the like for mounting the probe section 62 to a frame (not shown) or other support. It will be understood that other mounting arrangements can be used for installing the probe section 62 within a tank or the like.

Referring again to FIG. 1, the electronics section 12 preferably includes a PCB 76 with a touch-sensitive module 78 connected to the antenna probes 26-48 of the probe section 14 via I/O ports 95, a power conditioning module 80 that interfaces between the power supply 22 and the touch-sensitive module 80, and a signal conditioning module 82 that interfaces between the display/control circuitry 24 and the touch-sensitive module 78. The power conditioning module 78 can include various electronic components (not shown) in a well-known manner to regulate power from the power supply 22 and meet requirements of original equipment manufacturers (OEM's) to filter noise, spikes and other electrical anomalies that may negatively affect operation of the electronics section 12. It will be understood that the power conditioning module 80 can be eliminated and/or replaced with appropriate electronics in the touch-sensitive module 78 depending on the particular measurement application and features of the touch-sensitive module.

The signal conditioning module 82 can include electrical components (not shown) for interfacing with the display 24 in a well-known manner and/or control circuitry for operating a pump, alarm, and so on. The signal conditioning module is of well-known construction and therefore will not be further described.

As shown in FIG. 2, the touch-sensitive module 78 is preferably embodied as a programmable System-on-Chip (SoC) device that is normally associated with capacitive-type touch sensitive devices, such as touch-screens and touch-controls, for detecting movement and/or position of a finger or stylus. Such chips are currently used for touch sensitive displays and controls associated with phones, personal digital assistants (PDA's), portable music players, and the like. Due to popularity and the sheer numbers of these chips available from various manufacturers, they are extremely cost-effective when compared to other systems having individual components. This is especially important in the transportation industry where there has been a long-felt need for low-cost, liquid level sensors that deliver accurate readings independent of liquid type and environmental factors.

The SoC device preferably includes a chip with I/O ports 95, an integrated processor 84, memory 86 connected to the processor, and a plurality of oscillator circuits 88 (only one shown) connected between different ports 89 of the processor and the I/O ports 95, which are in turn connected to the antenna probes 26-48. Preferably, the number of oscillator circuits 88 is equal to or greater than the number of antenna probes being monitored. Each oscillator circuit 88 is multiplexed by the processor 84 so that a separate measurement can be determined for each antenna probe without interference from the other antenna probes. The memory 86 preferably includes both volatile memory, such as RAM, and non-volatile memory, such as EEPROM, for programming functions and data storage.

Each oscillator circuit 88 is identical in construction and therefore will be described as it applies to the antenna probe 26, it being understood that identical circuits would also be associated with the remaining antenna probes. The oscillator circuit 88 is preferably in the form of a relaxation oscillator that includes a charging current source 90 and a comparator 92 with a reset switch 94. The comparator 92 has two analog voltage inputs (labeled positive and negative) and a single digital output 96 having on and off states. The internal chip power, the comparator's positive input and an I/O port 95 (FIG. 1) of the module 78 are connected to the positive end of the charging capacitor, in this case the connection end 58 of the antenna probe 26. Only internal chip power is connected to the comparator's negative input, thus providing a threshold voltage for comparison purposes. The reset switch 94, which may be in the form of a FET or other switching device, temporarily connects the positive end 58 of the charged antenna probe 26 to ground when actuated to ensure complete discharge of the antenna probe 26 prior to each charging cycle. With these components in place, the electronics section 12 is ready to begin reading and evaluating the external capacitive antenna probes attached to each of its input pins. Again, although twelve antenna probes are shown, it will be understood that more or less probes and input pins may be provided. It will be further understood that a single oscillator circuit can be provided for a plurality of probes instead of plurality of oscillator circuits. With this embodiment, a multiplexer or the like can be used to sequentially obtain the probe readings through the single oscillator circuit.

More information on a suitable programmable SoC device can be found in U.S. Pat. No. 7,307,485 issued to Snyder et al., the disclosure of which is hereby incorporated by reference. Suitable touch-sensitive modules 78 are currently available from Cypress Semiconductor Corp. of San Jose, Calif. under the CY8C21 series of programmable SoC devices as well as from Texas Instruments of Dallas, Tex. and other manufacturers.

It will be understood that the touch-sensitive module 78 need not be entirely embedded in a chip but may include separate electrical components and/or systems that could be used for detecting a change in electrical properties of the antenna probe(s) as the liquid or other material being measured travels up and down the probe.

In operation, and again only referring to the antenna probe 26, when a measuring cycle is initiated on the chip's port 95 that connects with the positive end 58 of the antenna probe 26, the reset switch 94 is first closed to deplete any charges remaining on the antenna probe. Once depleted, the reset switch 94 is opened to commence charging of the antenna probe 26. As the antenna probe charges, the voltage on its positive input steadily approaches the threshold voltage on the comparator's negative input. When the charge voltage of the antenna probe 26 reaches the preset threshold voltage, the output 96 of the comparator 92 turns on the reset switch 94 to thereby close the circuit and discharge the antenna probe 26 to ground, causing the charging cycle to start over again. The antenna probe functions as one side of a capacitor plate of the relaxation oscillator which has a fixed physical area. Since the substrate insulates the internal plate (antenna) of the capacitor, the surrounding fluent material becomes the other plate of the capacitor. As the fluent material travels up the probe, the area of the oscillator's second (fluent) plate increases proportionally. In turn, the value of the capacitance or the oscillator changes which can be quantified by reading the resulting changes in the frequency of the relaxation oscillator frequency. The varying frequency is converted to increasing or decreasing counts depending on the fluid rising or falling along the length of the probe antenna. For example, as shown in FIG. 1, the rate of the capacitance charge/discharge is greater at the material level 18A than at the level 18. Consequently, the rate of capacitive charge and discharge can be translated into counts per scan of the antenna probe. By analyzing these counts in the processor 84, the particular capacitive state of the antenna probe 26, and thus the material level, can be accurately determined.

Referring now to FIG. 6, a method 100 of determining material level is illustrated. The method 100 is preferably embodied as a software program in the memory 86 of the touch-sensitive module 78 for providing various instructions to the processor 84. In general, the method preferably includes the steps of: 1) pre-calibrating the capacitive transducer 10 prior to immersion in a material to be measured; 2) reading the current probe values into memory; 3) determining the material level based on the currently stored probe values and the pre-calibrated probe values; 4) performing a dynamic calibration after each reading to compensate for material type, resonance, temperature and so on; and 5) repeating steps 2) through 4).

Upon power-up of the capacitive transducer 10, as represented by block 102, an initialization routine is performed at block 104 to reset all ports, analog and digital blocks, portions of the memory, as well as software variables. At block 106, the antenna probes are sequentially scanned to obtain the particular count value of each probe, as will be described in greater detail with respect to FIG. 7.

At block 108, when it has been determined that all probes have been scanned, their count values are summed and averaged at block 110. If it has been determined, at block 112, that the capacitive transducer 10 has not been pre-calibrated, a pre-calibration routine is performed, at block 114, to determine the optimal threshold voltage, scan rate and dry count value of each probe, as will be described in greater detail with respect to FIG. 8. These values are then stored in memory and used as reference count values to determine the presence or absence of liquid or other material on each probe. The pre-calibration routine is preferably performed only once at the factory or at least before the capacitive transducer 10 is put into actual use.

When it has been determined that the capacitive transducer 10 has been pre-calibrated, it is determined how many probes have been activated, i.e. how many probe tips are submerged in the material being measured. With the dry, i.e. pre-calibrated, count value as a reference, when the level of material reaches one or more of the lower tips 56A-56L, an immediate increase in count value will occur due to the change in capacitance of the affected antenna probe(s). This immediate increase in value can then be used to determine when the material level has reached the lower tip of a particular probe.

Figure 9:
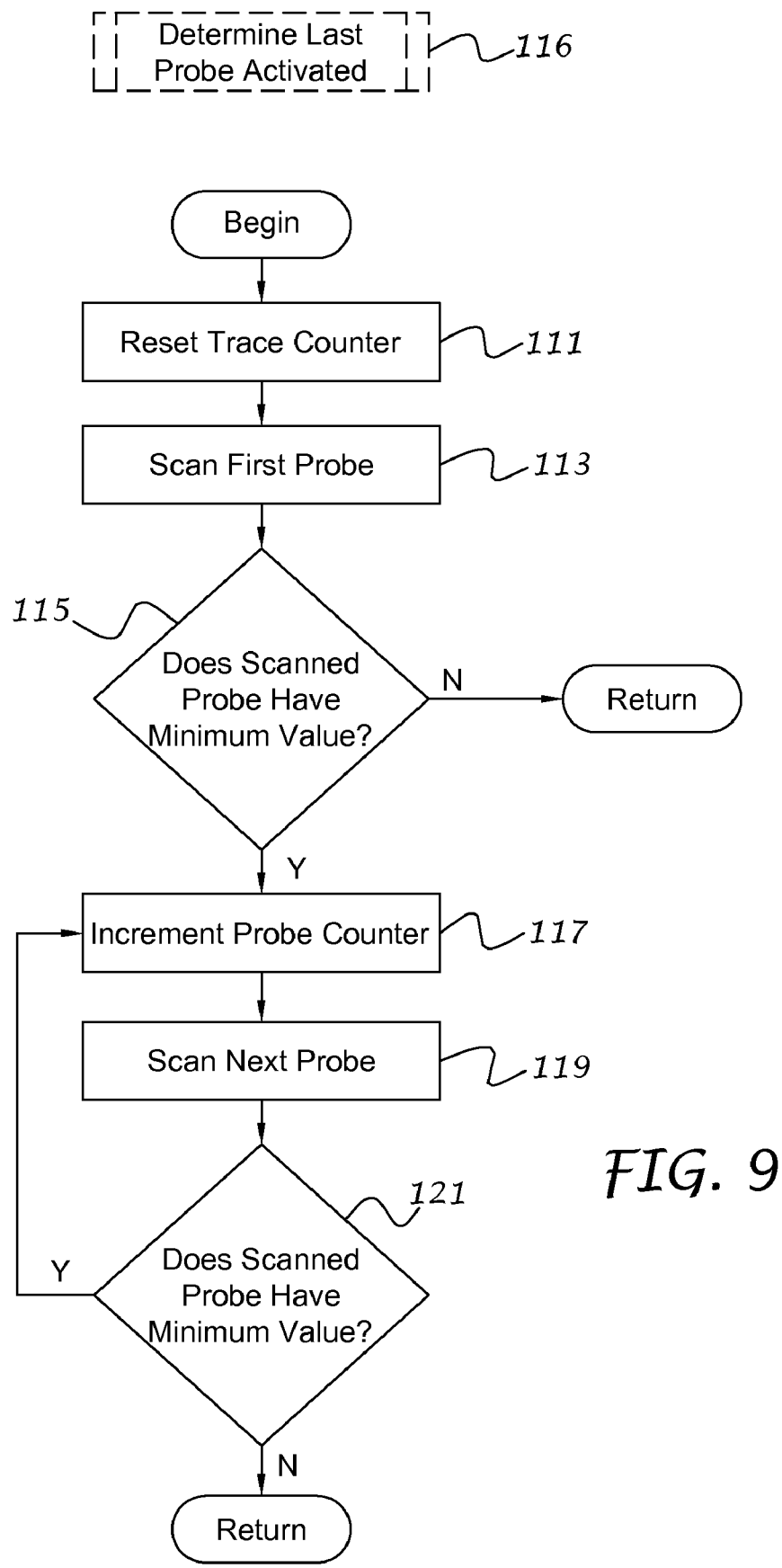
FIG. 9 is a block diagram of a method for determining the number of antenna probes activated.

As shown in FIG. 9, in order to determine the number of probes activated, the internal trace counter, which may be an internal memory cell, is reset at block 111. The first probe is then scanned at block 113 and the actual count value for that probe is compared with the stored pre-calibrated count value. If the actual count value is greater than a predetermined amount, as shown at block 115, the probe counter is incremented by the value of one at block 117 to indicate that the level of material has reached at least one probe. If the actual count value for the scanned probe is less than the predetermined amount, then it is determined that the material level is below the probe tip and the program is returned to the main loop in FIG. 6. At block 119, the next probe in sequence is preferably scanned to determined whether or not it has been actuated at block 121. If so, the probe counter is incremented by the value of one at block 117 to indicate that at least two probe tips are immersed in the material. This loop continues until all of the antenna probes have been scanned.

The number of activated probes represents discrete material level points since the probe tips are positioned at predetermined intervals along the probe section 14 and can thus be used to determine a coarse material level. By way of example only, a probe section 14, in accordance with FIGS. 3 and 5, is provided with 12 antenna probes 26-48. If the lower tip 56A-56L of each antenna probe 26-48, respectively, is spaced two inches from the lower tip of an adjacent antenna probe, a total of eleven two-inch spaces 60A-60K are created between adjacent tips and the total measurement length of the probe section 14 is approximately 24 inches. It can be determined that, for example, probe tips 56A, 56B, 56C and 56D have been activated by immersion into the material being measured with probe tip 56A serving as the zero or "empty" point. Accordingly, a coarse reading indicating that the material is at a depth of about six inches in the tank can be determined.

In order to obtain a more accurate reading of the material level, a delta value is calculated at block 118 (FIG. 6) between the last activated probe tip and the next higher probe tip since the actual material level may be somewhere between the two probe tips. In accordance with the present example, since the last activated probe tip is 56D, a delta value is calculated between the probe tips 56D and 56E to determine the actual material level between these tips. If, for example, the primary probe 26 has a count value of 100 at the beginning of tip 56C and a count value of 150 upon reaching the next tip 56D, then the delta tip space count is 150−100=50 for the space 60C. If, on the next scan, the antenna probe has a count value of 175, then the distance toward the next probe tip 56E (which has not yet been reached by the material) can be calculated by dividing the difference of the present count value and the tip 56D by the count value of the space 60C then multiplied by the distance of the space (two inches) to give ((175−150)/50)(2) =1 inch as the delta value. The level is then calculated at block 120 by adding the delta value to the distance equivalent to the probe tips activated. In the present example, since the material has already reached three tips 56B, 56C and 56D, and since the distance between each tip is 2 inches, the total height of the material is calculated by summing the delta value with the height of the three spaces 60A, 60B and 60C associated with the three immersed tips 56B, 56C and 56D. Accordingly, the height is computed to be 6 inches plus the 1 inch delta value to equal 7 inches. It will be understood that the above count values, probe section length, number of probes, as well as the particular space dimensions are given by way of example only and can greatly vary. In addition, although the spaces 60A-60k are shown as being of equal dimension, it will be understood that they may have different dimensions.

Once the actual height of the material level has been determined, and depending on whether the determined level will be displayed and/or used to operate further control circuitry, such as turning on or off a pump, alarm, and so on, further processing can occur to send the level signal to a display, as shown at block 122, and/or the control circuitry. For example, a percent full (or empty) value can be determined by dividing the total measurement length of the probe section 14 by the total height of the material. In the above example using a 24-inch probe section and a determined level of 7 inches, the tank can be calculated as being 29.17% full. This value can then be used to calculate the proportional voltage output needed for driving the display, such as a fuel gauge (not shown), to which the capacitive transducer 10 is attached. The fuel gauge can be driven through pulse-width modulation, a resistor divider network connected to ports of the programmable SoC, and so on.

Figure 10:
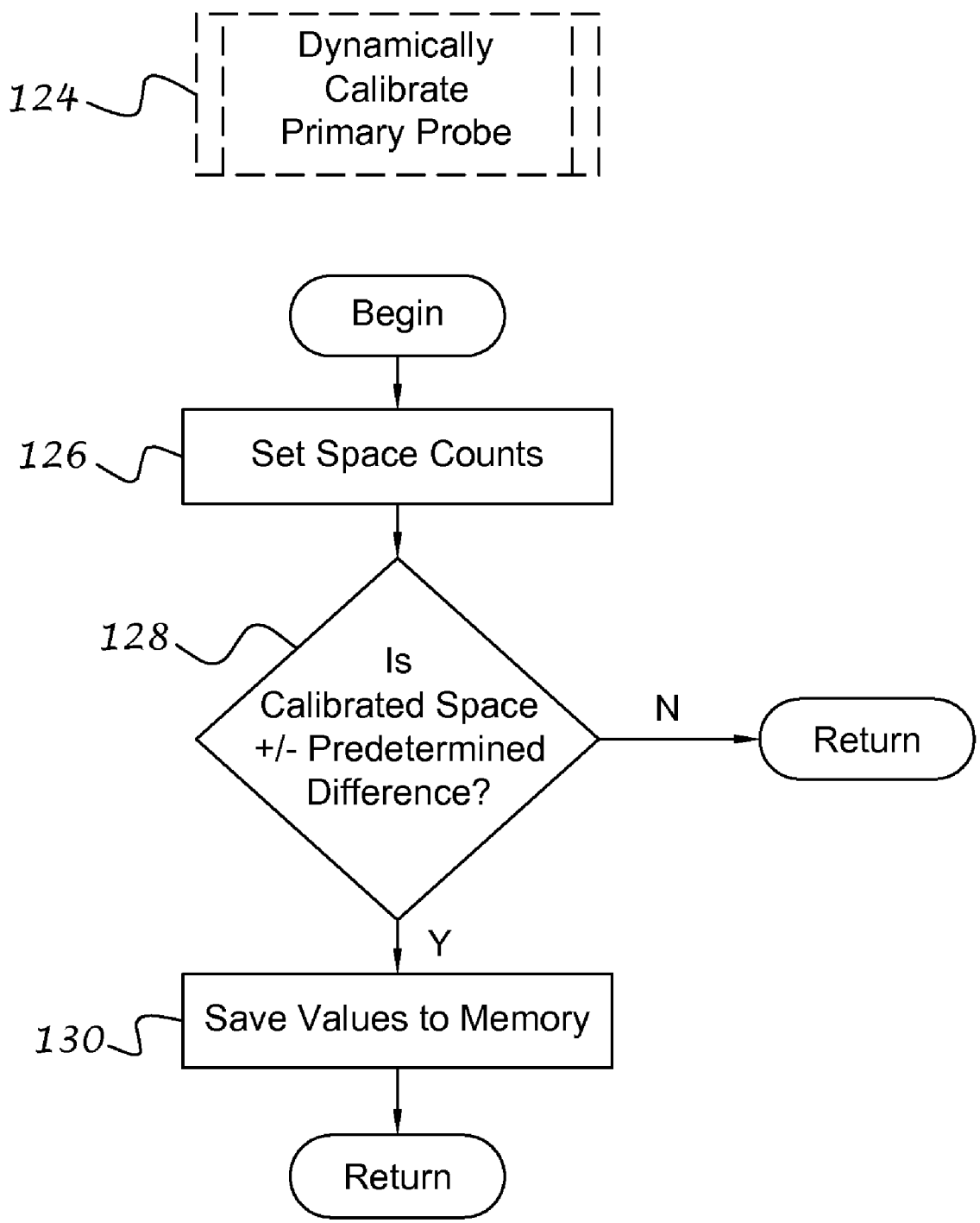
FIG. 10 is a block diagram of a method for calibrating the space between adjacent antenna probes during real-time calibration of the capacitive transducer.

After the level has been calculated, dynamic calibration of the primary probe 26 is performed at block 124. As shown in FIG. 10, the primary probe 26 is calibrated by saving the current count value for a particular space by using the total delta count value of the primary probe 26 (FIG. 3) upon activation of the next probe tip value. For example, if the liquid level rises along the probe section 14 to the tip 56B of the probe 28, the primary probe 26 will have a certain count value. If that count value does not correspond to the previously stored count value for that level, it is determined at block 128 whether the difference between the current count value and the stored count value is above or below a predetermined limit. If not, the dynamic calibration routine exits and returns to the scan probes routine 106 (FIG. 6). If the predetermined limit has been reached or exceeded, the current count value replaces the previously stored value in memory, as shown at block 130. The dynamic calibration routine then exits and returns to the scan probes routine 106.

The dynamic calibration routine 124 is preferably performed each time actuation of a new probe tip is detected. In this manner, the primary probe 26 can be dynamically calibrated along the length of the probe section 14 corresponding to the number of probes provided. Thus, the dynamic calibration routine achieves self-calibration of the sensor device 10 independent of liquid type and ambient conditions by continuously reading all probes and periodically readjusting the capacitive count values between probe tips.

Figure 7:
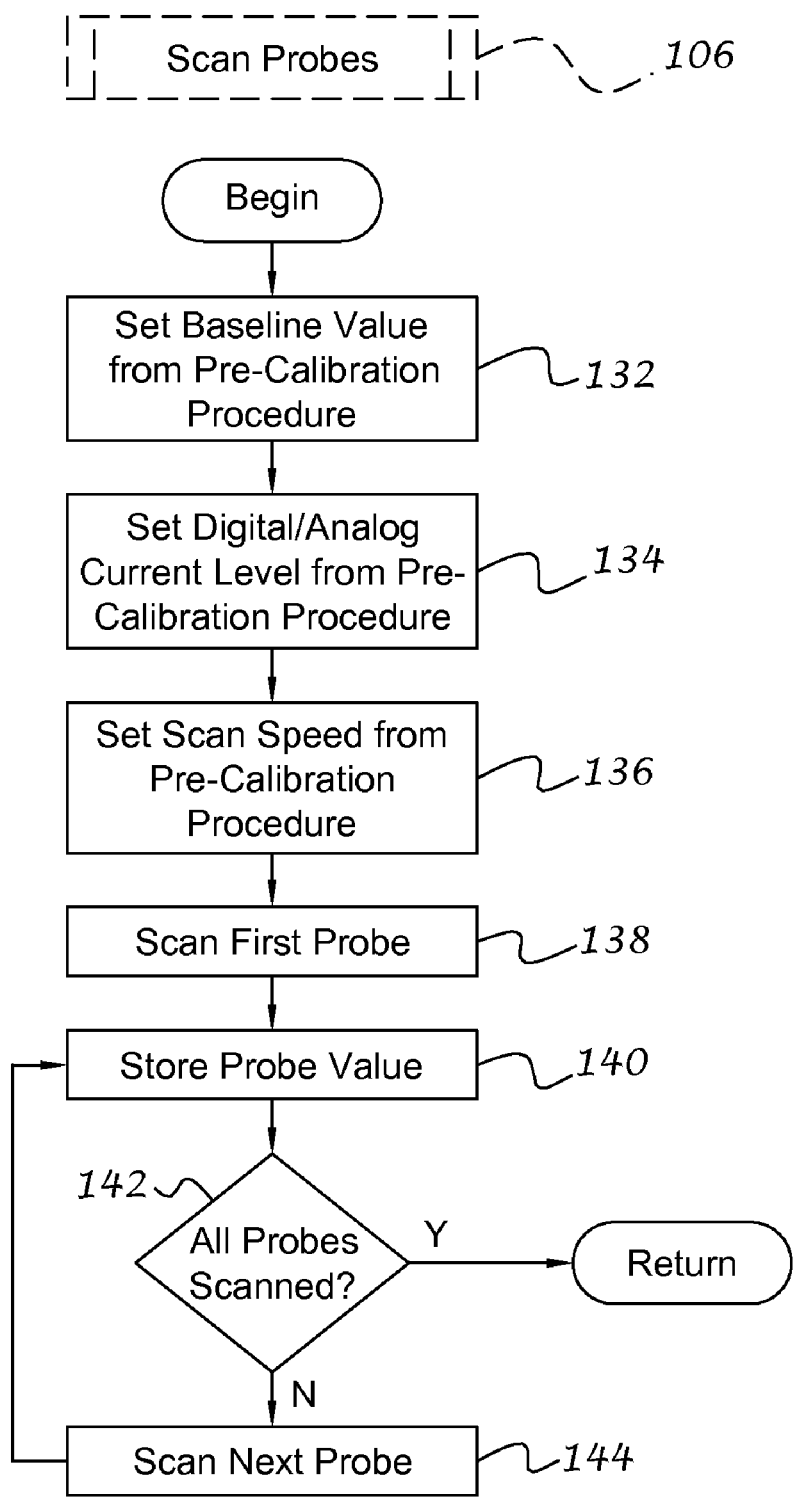
FIG. 7 is a block diagram of a method for scanning each antenna probe in accordance with the present invention.

Turning now to FIG. 7, the scan probes routine 106 is illustrated. At block 132, the baseline dry count value is set for each antenna probe as determined from the pre-calibration procedure 114 (FIG. 6). At block 134, the optimized threshold voltage or Digital/Analog Current (DAC) level is set as determined from the pre-calibration procedure. At block 136, the optimized scan speed is set as determined from the pre-calibration procedure. At block 138, the first antenna probe, such as probe 26 (FIG. 3), is scanned at the predetermined optimal scan speed by applying the DAC to the connection end 58 of the probe 26 for a predetermined time period while isolating all other probes so that electrical interference from the remaining probes does not occur. At block 140, the real time capacitive reading of the first probe is then stored as a count value. If, at block 142, it is determined that all probes have not been scanned, the next probe is scanned, at block 144, to obtain its count value which is then stored in memory. This process continues until all of the antenna probes have been scanned. As described above, the when the antenna probes are immersed in liquid or other material, the pre-determined dry calibration count values are automatically subtracted from the current count values for each probe to asses the impact that the material level has on the capacitive value of each probe.

Figure 8:
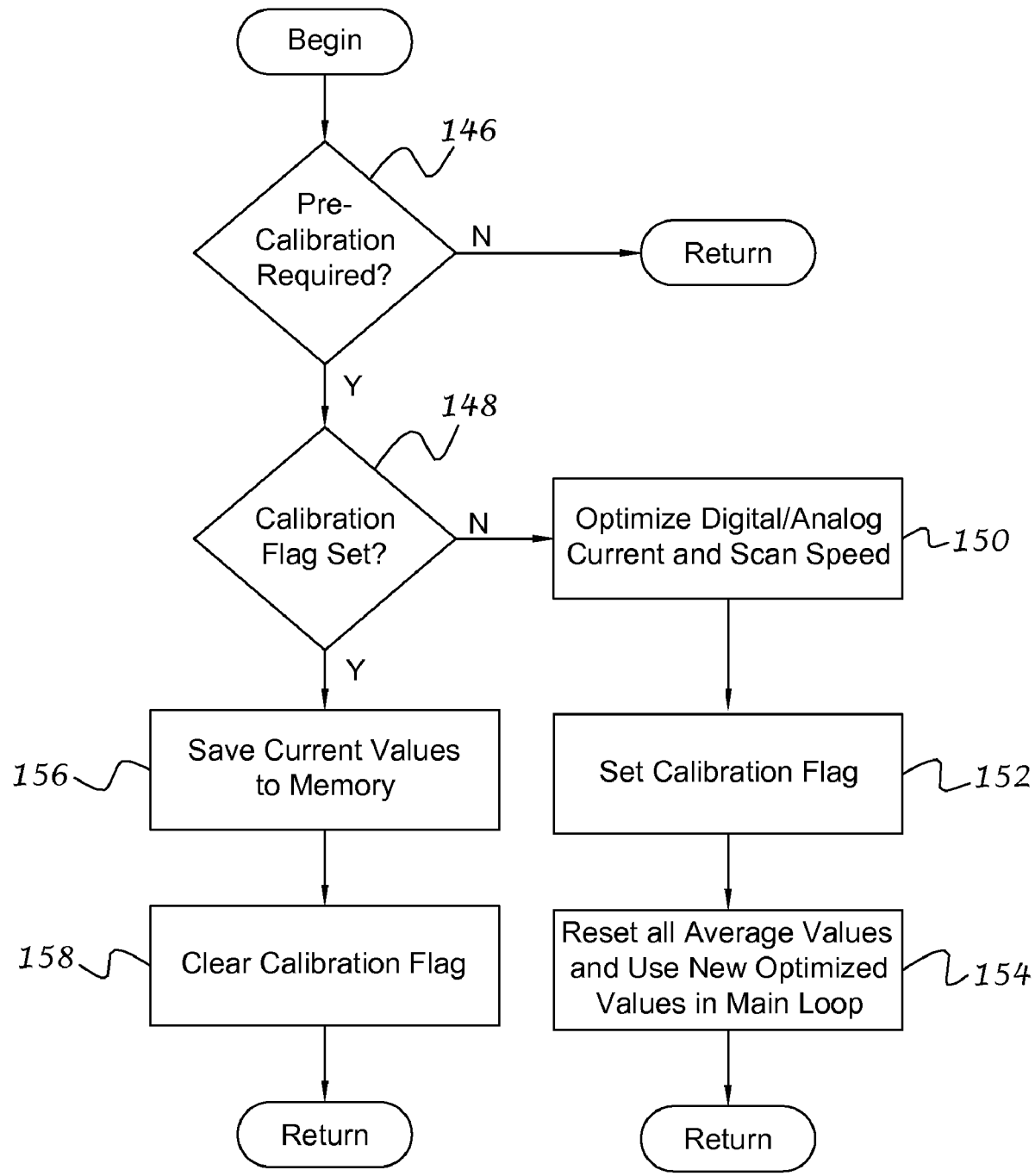
FIG. 8 is a block diagram of a method for pre-calibrating the capacitive transducer in accordance with the present invention.

Referring now to FIG. 8, the pre-calibration routine 114 is illustrated. The pre-calibration routine not only determines a dry count value of each probe as described above, but also optimizes the threshold voltage (DAC) and scan rate to ensure maximum measurement efficiency and greater accuracy. As the software program prepares to execute its sensing algorithm 100 (FIG. 6), it allocates twelve internal microprocessor RAM memory cells corresponding to the number of antenna probes, in accordance with the present example. Since the derived relaxation count values are stored in these cells, measures must be taken to ensure these values do not overflow the memory cells during scanning and processing of the probes. Accordingly, it is first determined at block 146 whether or not pre-calibration is required. If so, it is then determined, at block 148, if a calibration flag has been set. If not, the threshold voltage and scan speed are optimized at block 150. The twelve volatile memory accumulators are preferably allocated to hold at most 32,000 oscillator relaxation counts at the end of a probe scan, which corresponds to about half of an internal RAM 16-bit word in the memory 86 of the SoC chip 78. It has been found that setting the maximum counts to no more than 32,000 is optimal for the manner in which the capacitance of each antenna probe is measured. However, it will be understood that the internal volatile memory accumulators may have a larger or smaller word size and/or the maximum counts can be set at any desired value.

During the pre-calibration routine, the touch-sensitive module 78 performs a capacitive measurement scan on its twelve probes in a dry state, i.e. before the probe section 14 is immersed in liquid or other wet or dry materials to be measured. As each individual probe is analyzed, the program cycles through varying voltage levels to arrive at the best comparator threshold input. Probe relaxation counts are measured and stored in their respective memory cells for each probe. In order to determine the optimum threshold voltage, the voltage is steadily increased until the counts of the relaxation oscillator are as large as possible without exceeding the value of 32,000. At that time, the optimum threshold voltage is determined and captured for the particular probe under analysis. Once the twelve probes are scanned and processed, their voltages are then averaged together and a calibration flag is set.

The pre-calibration routine then uses the calculated average as the single comparator threshold voltage for the entire set of probes. The threshold voltage remains constant while an optimum probe scan rate is determined. The scan rate is the amount of elapsed time between the reading and processing of all of the antenna probes. Obtaining an optimum scan rate ensures optimum accuracy of the probe capacitance measurement. Once again, the touch-sensitive module 78 performs a capacitive measurement scan on its twelve probes in a dry state. As each individual probe is analyzed, the program cycles through varying speeds or time periods to arrive at the optimum scan rate. Probe relaxation counts are measured and stored in their respective memory cells for each probe. In order to determine the optimum scan rate, the time period is preferably steadily increased until the relaxation oscillator's counts are as large as possible without exceeding the value of 32,000. At that time, the optimum scan rate is determined and captured for the particular probe under analysis. Once the twelve probes are scanned and processed, their scan rates are then averaged. The calibration flag is then set at block 152. At block 154, all average values are reset to zero and re-averaged using the new calibrated optimum threshold voltage and scan rate in the main loop to cycle through the last stage of the pre-calibration routine 114.

With the optimal threshold voltage and scan rate stored in memory, the probes are now ready to be scanned with greater accuracy. Accordingly, the probes are again scanned and averaged in their dry state, as shown at blocks 106-110 (FIG. 6) before entering the final stage of the pre-calibration routine 114.

The final stage of the pre-calibration routine, as shown in FIG. 8, includes determining that pre-calibration is required at block 146, determining that the calibration flag has been set at block 148, then saving the current dry count values for each antenna probe into the chip's non-volatile memory for permanent storage at block 156. The calibration flag is then cleared at block 158 and the permanently stored values are used in the main loop to calculate actual material level as previously described.

It will be understood that the particular number of probes used in the description above is by way of example only and that the number of probes can greatly vary. It has been demonstrated that a minimum of two antenna probes will enable calculation or calibration of the slope corresponding to different fluids as well as fluid level since each antenna end point is at a known depth in the tank.

It will be understood that the term "preferably" as used throughout the specification refers to one or more exemplary embodiments of the invention and therefore is not to be interpreted in any limiting sense. It will be further understood that the term "connect" and its various derivatives as may be used throughout the specification refer to components that may be joined together either directly or through one or more intermediate members. In addition, terms of orientation and/or position as may be used throughout the specification relate to relative rather than absolute orientations and/or positions.

It will be appreciated by those skilled in the art that changes could be made to the embodiments described above without departing from the broad inventive concept thereof. It will be understood, therefore, that this invention is not limited to the particular embodiments disclosed, but is intended to cover modifications within the spirit and scope of the present invention as defined by the appended claims.

I claim:

1. A method of determining material level comprising:
providing a plurality of capacitive antenna probes with end tips at discrete positions representing different predetermined material levels, the capacitive antenna probes being electrically isolated from each other such that a capacitive value for each antenna probe is measured independently of the other antenna probes;
establishing a pre-calibrated capacitive reference value for each probe;
reading a present capacitive value for each probe;
determining the material level based on the present probe values and probe reference values; and
performing a dynamic calibration after each reading to automatically compensate for variations in material properties and ambient conditions.

2. A method of determining material level comprising:
providing a plurality of capacitive antenna probes with end tips at discrete positions representing different predetermined material levels;
establishing a pre-calibrated capacitive reference value for each probe;
reading a present capacitive value for each probe;
determining the material level based on the present probe values and probe reference values; and
performing a dynamic calibration after each reading to automatically compensate for variations in material properties and ambient conditions;
wherein the step of establishing a pre-calibrated reference value for each probe comprises determining an optimal threshold voltage and scan speed to be applied to each probe during the reading step.

3. A method according to claim 2, wherein the step of establishing a pre-calibrated reference value for each probe further comprises reading a dry value for each probe based on the optimal threshold voltage and scan speed.

4. A method of determining material level comprising:
providing a plurality of capacitive antenna probes with end tips at discrete positions representing different predetermined material levels;
establishing a pre-calibrated capacitive reference value for each probe;
reading a present capacitive value for each probe;
determining the material level based on the present probe values and probe reference values; and
performing a dynamic calibration after each reading to automatically compensate for variations in material properties and ambient conditions;
wherein the step of determining the material level comprises:
establishing a primary probe and at least one secondary probe from the plurality of probes;
determining a coarse material level by counting the number of end tips activated by the presence of the material; and
determining a fine material level by 1) calculating a delta value of the primary probe between the last end tip activated and an adjacent tip that has not been activated, and 2) adding the delta value to the coarse material level.

5. A method according to claim 4, wherein the step of calculating the delta value comprises:
determining one or more space values between activated probe tips; and
calculating a difference between the primary probe value and a summation of the one or more space values.

6. A method according to claim 5, wherein the step of performing a dynamic calibration comprises:
detecting activation of an end tip for determining a predefined material level that has been reached;
reading the primary probe value upon activation of the end tip; and
associating the primary probe value with the predefined material level.

* * * * *